United States Patent
Voth

(12) United States Patent (10) Patent No.: US 6,199,169 B1
Voth (45) Date of Patent: Mar. 6, 2001

(54) SYSTEM AND METHOD FOR SYNCHRONIZING TIME ACROSS A COMPUTER CLUSTER

(75) Inventor: Duane J. Voth, Austin, TX (US)

(73) Assignee: Compaq Computer Corporation, Cupertino, CA (US)

( * ) Notice: Subject to any disclaimer, the term of this patent is extended or adjusted under 35 U.S.C. 154(b) by 0 days.

(21) Appl. No.: 09/212,021

(22) Filed: Dec. 15, 1998

Related U.S. Application Data

(60) Provisional application No. 60/080,156, filed on Mar. 31, 1998.

(51) Int. Cl.[7] .................................................. G06F 1/12

(52) U.S. Cl. ........................ 713/400; 709/248; 709/400

(58) Field of Search ........................... 713/400; 709/248, 709/400

(56) References Cited

U.S. PATENT DOCUMENTS

| | | | | |
|---|---|---|---|---|
| 5,428,645 | * | 6/1995 | Dolev et al. ........................ | 375/354 |
| 5,579,513 | * | 11/1996 | Strohmer ............................. | 713/600 |
| 5,689,688 | * | 11/1997 | Strong et al. ....................... | 709/400 |

\* cited by examiner

*Primary Examiner*—Thomas M. Heckler
(74) *Attorney, Agent, or Firm*—Fenwick & West LLP

(57) ABSTRACT

A system for time synchronization in a computer cluster is provided. For the system of the present invention a master node sends a SYNC message including a first time stamp to a slave node. The slave node adds a second time stamp and returns the SYNC message to the master node. The master node then adds a third time stamp to the SYNC message. Using the three time stamps, the master node determines if the time clock within the slave node leads or follows the time clock in the master node. The calculation does not depend on the assumption that transmission delays to the slave node are the same as the transmission delays from the node. If the time clocks do not match, the master node sends an INFO message to the slave node informing the slave node of the correct time for clocks within the computer cluster.

5 Claims, 8 Drawing Sheets

400

500

SYSTEM AND METHOD FOR SYNCHRONIZING TIME ACROSS A COMPUTER CLUSTER

RELATED APPLICATION

The following application claims the benefit of US Provisional Application Serial No. 60/080,156 entitled "System and Method For Synchronizing Time Across A Computer Cluster" by Duane Voth, filed Mar. 31, 1998, the disclosure of which is incorporated in this document by reference.

FIELD OF THE INVENTION

This invention relates generally to timekeeping within computer networks. More particularly, this invention relates to a system and method for synchronizing the real time clocks within the nodes of a computer cluster.

BACKGROUND OF THE INVENTION

Computer clusters are an increasingly popular alternative to more traditional computer architectures. A computer cluster is a collection of individual computers (known as nodes) that are interconnected to provide a single computing system. The use of a collection of nodes has a number of advantages over more traditional computer architectures. One easily appreciated advantage is the fact that nodes within a computer cluster tend to fail independently. As a result, in the event of a node failure, the majority of nodes within a computer cluster may survive in an operational state. This has made the use of computer clusters especially popular in environments where continuous availability is required.

A fundamental problem with clusters is that the computer clock of each cluster node generally drifts away from the correct time at a different rate. The rate at which a clock drifts is typically measured in parts-per-million (ppm). For example, the clocks used within the Tandem NonStop__UX S4000 computer series are specified to have a drift of less than 25 ppm. This makes the clocks of these systems accurate to approximately 2 seconds per day. Without a correction mechanism, the clocks within a computer cluster will eventually drift far enough that applications that expect synchronized time may begin to work incorrectly.

Several methods have been developed to reduce node-to-node clock differences in computer networks and clusters. One simple method is to set the clock of each node at boot time. This method is useful for reducing large node-to-node time differences. Setting clocks at boot time does little, however, to reduce inaccuracies due to clock drift. Thus, each clock may start at the correct time, but time across the cluster will become increasingly inaccurate over time. A second method for reducing node-to-node clock differences is to periodically synchronize the time of each node against a master clock. If the time between synchronizations is small, each clock will only experience a limited between-synchronization drift. As a result, total node-to-node differences between clocks can be reduced to tolerable limits.

Protocols for synchronizing time against a master clock must account for the propagation delays that exist between the node where the master clock is located (the master node) and the nodes that are to be synchronized (the slave nodes). Otherwise, the clock of each slave node will lag behind the clock of the master node by an amount that is approximately equal to the propagation delay to that slave node. In cases where computers are connected using ethernet-type networks, a relatively simple mechanism exists for accurately calculating propagation delays. To use this mechanism, the master node sends a message to a slave node. The slave node then responds with an acknowledgment message. The master node then calculates a propagation delay by computing the round trip time (of the message and its acknowledgments) and dividing by two. The master node synchronizes time by sending a message including the sum of the propagation delay and its current clock time to the slave node.

The simple mechanism used to calculate propagation delays in ethernet-type networks works because nodes in these networks use a single connection for sending and receiving messages. The use of a single connection means that the propagation times to and from a node are approximately equal. This allows the propagation delay to a node to be computed as round trip time divided by two. Unfortunately, there are highly desirable network types that do not provide the same uniformity of sending and receiving propagation delays. Networks of this type include Tandem Computer's Servernet products. Each node in a Servernet network has separate network connections: a first for sending and a second for receiving. Separate connections means that the propagation delays to and from a node may not be the same. This makes the mechanism used in ethernet-type networks unsuitable for use in networks like Tandem's Servernet.

Based on the preceding discussion, it is not hard to appreciate that a need exists for time synchronization systems that are suitable for use in networks where the ethernet simplification does not apply. There is also a need for new or extended time synchronization systems that fulfill a range of other currently unmet needs. For example, currently available time synchronization systems often fail when faced with significant clock frequency errors. Currently available time synchronization systems may also fail when faced with heavily loaded or congested works. Both of these failures indicate that currently available time synchronization systems lack the ability to provide the type of fault-tolerant operation that is desirable. Currently available time synchronization systems may also require the network to process large numbers of synchronization messages. A large number of synchronization messages steals network bandwidth from other computing tasks.

Thus, there is a need for fault tolerant techniques that synchronize system clocks across the nodes of a cluster that have minimal affect on, and are minimally affected by, communication traffic throughout the cluster.

SUMMARY OF THE INVENTION

An embodiment of the present invention includes a system for time synchronization in a computer cluster and scheduling time changes across the cluster. The system of the present invention uses a repeating update cycle. During the first part of this cycle, a master node within the Single System Image (SSI) cluster contacts each of the slave nodes within the SSI cluster. In each case, the master node sends the slave a SYNC message. The SYNC message includes a first time stamp indicating the time at which the message was sent. The slave node adds a second time stamp and returns the SYNC message to the master node. The master node then adds a third time stamp to the SYNC message. Using the three time stamps, the master node determines if the time clock within the slave node leads or follows the time clock in the master node. The calculation does not depend on the assumption that transmission delays to the slave node are the same as the transmission delays from the node. If the time clocks do not match within the specified tolerance, the master node sends an INFO message to the slave node. The INFO message specifies a time adjustment for the time clock within the slave node. If a cluster wide time change is required, the master node will send an INFO message to all slave nodes that includes each specific master/slave difference and the adjustment for the entire cluster. The INFO message also includes a time at which the specified time adjustment is to be applied.

During the second portion of the update cycle, each slave node applies the time adjustment specified by the master node (if the master node specified a time adjustment for that slave node). Large adjustments gradually advance or retard the time clocks within the slave nodes. Each adjustment begins at the same time (i.e., the time specified by the master node). Small adjustments are applied immediately. The update cycle then repeats with another sequence of SYNC and INFO messages followed by scheduled time adjustments.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

ENVIRONMENT

Figure 1:
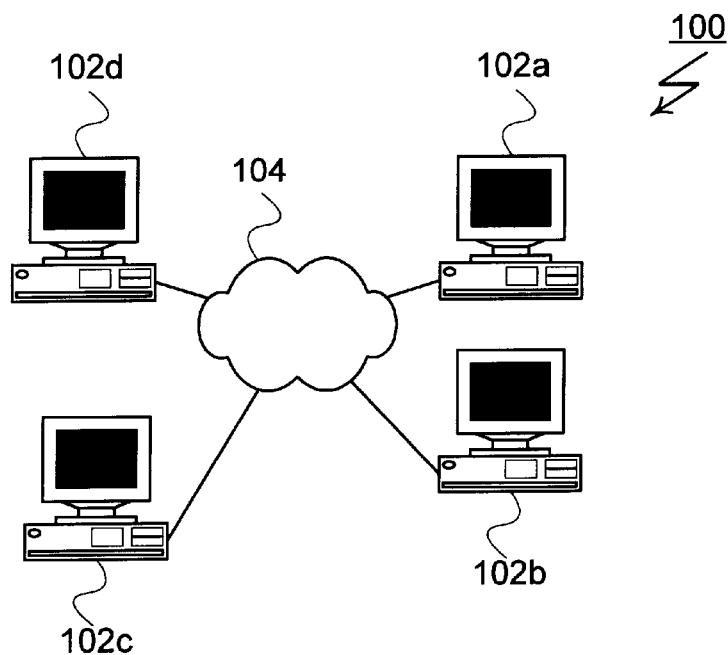
FIG. 1 is a block diagram of a computer cluster shown as an exemplary environment embodiment of the present invention.

In FIG. 1, a computer cluster is shown as a representative environment for the present invention and generally designated 100. Structurally, computer cluster 100 includes a series of nodes, of which nodes 102a through 102d are representative. Nodes 102 are intended to be representative of a wide range of computer system types including personal computers, workstations and mainframes. Although four nodes 102 are shown, computer cluster 100 may include any positive number of nodes 102. Nodes 102 may operate under distinct operating system types. For the described embodiment, nodes 102 preferably operate under control of UNIX® or UNIX-like operating systems.

Figure 2:
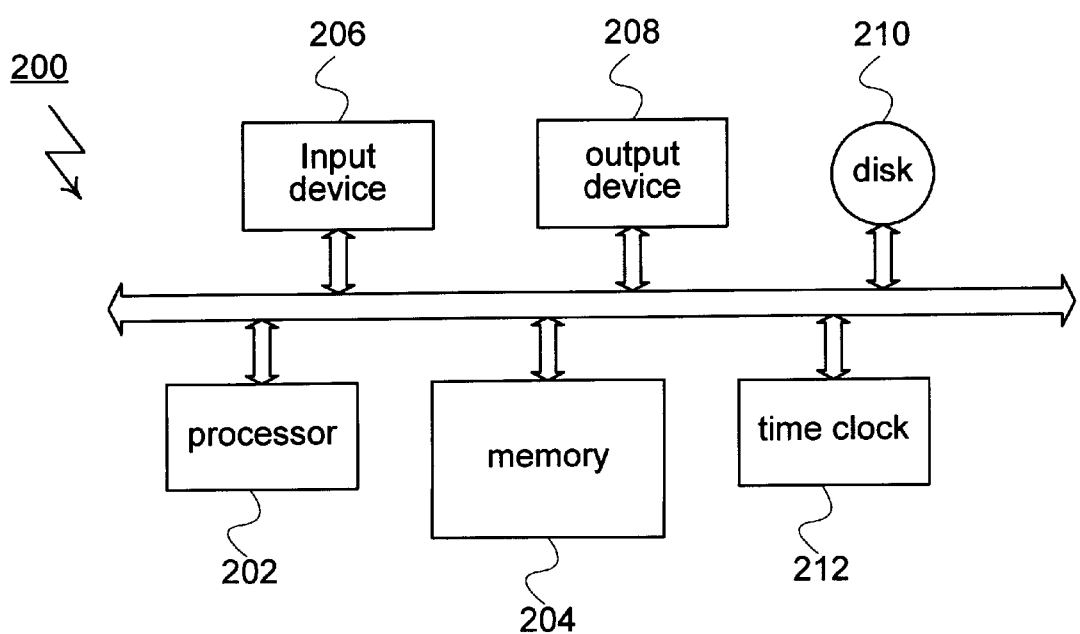
FIG. 2 is a block diagram showing a computer node as used within the environment of FIG. 1.

Nodes 102 are interconnected via computer network 104. Network 104 is intended to be representative of any number of different types of networks. For the described embodiment, computer network 104 is a high speed ServerNet Network, hereinafter referred to as TNet. As shown in FIG. 2, each node 102 includes a processor, or processors 202, and a memory 204. An input device 206 and an output device 208 are connected to processor 202 and memory 204. Input device 206 and output device 208 represent a wide range of varying I/O devices such as disk drives, keyboards, modems, network adapters, printers and displays. Each node 102 also includes a disk drive 210 of any suitable disk drive type (equivalently, disk drive 210 may be any non-volatile storage system such as "flash" memory). Nodes 102 also include a time clock 212. Time clock 212 is a crystal oscillator or other device and, for the described embodiment, has a resolution of microseconds or better.

TIME SYNCHRONIZATION PROTOCOL

The present invention includes a distributed system that maintains the synchronization between time clocks 212 within SSI cluster 100. For this system, one of the nodes 102 within SSI cluster 100 assumes a master role. The remaining nodes 102 then function as slaves (this description assumes that node 102a is the master node). The master node 102a cooperates with slave nodes 102b–d to ensure that each time clock 212 is synchronized.

Figure 3:
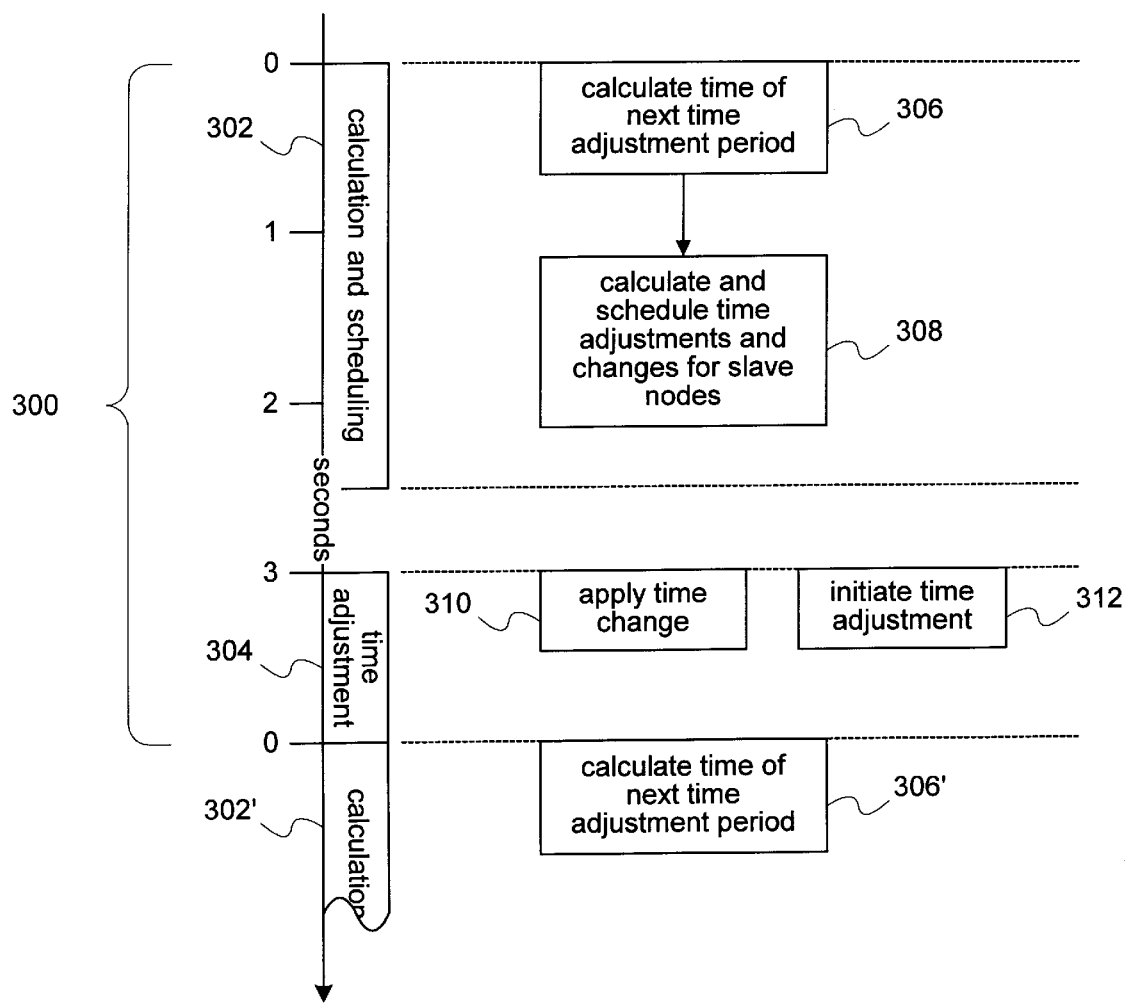
FIG. 3 is a time diagram showing a repeating update cycle as used within an embodiment of the present invention.

To synchronize time clocks 212, master node 102a and slave nodes 102b–d use a repeating update cycle of the form shown in FIG. 3 and labeled 300. Update cycle 300 includes an initial calculation and scheduling period 302 followed by a time adjustment period 304. Master node 102a initiates each calculation and scheduling period 302 by calculating the time at which the immediately following time adjustment period 304 will begin (see task 306). Master node 102a performs this calculation by adding a time value equivalent to the offset of adjustment period 304 within update cycle 300 to the current value of time clock 212a. Master node 102a stores the calculated time for later use.

Master node 102a then calculates and schedules time changes and time adjustments for slave nodes 102b–d (see task 308). Time changes cause slave nodes 102b–d to set their time clocks 212 to a specified value. Time adjustments, on the other hand, cause slave nodes 102b–d to gradually advance or retard their time clocks 212 by a specified amount. Master node 102a schedules time changes or adjustments for slave nodes 102 whenever a user or process has requested that the time used by SSI cluster 100 be changed or adjusted. In UNIX and UNIX-like environments, time changes are typically requested using the "stime" system call and time adjustments are typically requested using the "adjtime" system call. Master node 102a also schedules time adjustments to correct time offsets between slave nodes 102b–d and master node 102a. Master node 102a uses the time calculated during task 306 to specify when slave nodes 102b–d are to perform scheduled time changes and adjustments.

Each slave node 102b–d implements the time changes scheduled by master node 102a at the start of time adjustment period 304 (see task 310). Slave nodes 102b–d perform time changes by reinitializing their time clocks 212 to reflect the values specified by master node 102a. Each slave node 102b–d also begins the process of performing scheduled time adjustments at the start of time adjustment period 304 (see task 310). Slave nodes 102b–d perform these adjustments by making a series of small changes to time clocks 212 during time adjustment period 304. These changes continue until the value of time clocks 212 reflect the adjustment values specified by master node 102a.

During calculation and scheduling period 302, master node 102a communicates with slave nodes 102b–d to calculate and schedule time changes and adjustments. For the described embodiment, master node 102a communicates with slave nodes 102b–d using two message types. These are the SYNC message shown in FIG. 4 and generally designated 400 and the INFO message shown in FIG. 5 and generally designated 500.

Figure 4:
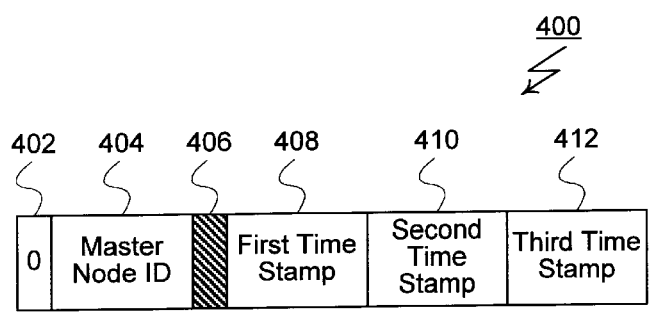
FIG. 4 is a block diagram of a SYNC message as used by an embodiment of the present invention.

As shown in FIG. 4, SYNC message 400 includes an eight bit header 402, a sixteen bit master node 102a id 404, an eight bit pad 406, a first time stamp 408, a second time stamp 410 and a third time stamp 412. First time stamp 408, second time stamp 410 and third time stamp 412 are sixty-four bit data structures that contain separate thirty-two bit variables for seconds and microseconds.

Header 402 contains a reserved value that distinguishes SYNC message 400 from other message types. For the described embodiment, the reserved value is zero. The master node 102a id 404 included in SYNC message 400 contains a unique value that identifies the node 102 on which SYNC message 400 originated. Pad 406 contains no data but ensures that first time stamp 408, second time stamp 410 and third time stamp 412 are each word aligned. When initialized, first time stamp 408, second time stamp 410 and third time stamp 412 each include values taken from time clocks 212. Initialization of first time stamp 408, second time stamp 410 and third time stamp 412 is described in following portions of this document. In general, it should be appreciated that the bit sizes of each of the components included in SYNC message 400 are all representative. Different implementations of the present invention may use different sizes for any, or all, of these components.

Figure 5:
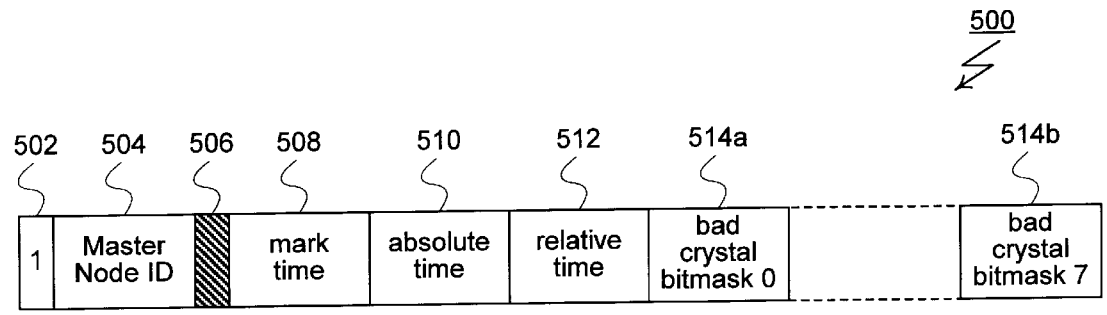
FIG. 5 is a block diagram of an INFO message as used by an embodiment of the invention.

As shown in FIG. 5, INFO message 500 includes an eight bit header 502, a sixteen bit master node 102a id 504, an eight bit pad 506, a mark time field 508, an absolute time field 510, and a relative time field 512. Mark time field 508, absolute time field 510 and relative time field 512 are sixty-four bit data structures that contain separate thirty-two bit variables for seconds and microseconds. INFO message 500 also includes eight thirty-two bit bad crystal bitmasks, of which bad crystal bitmasks 514a and 514b are representative.

Header 502 contains a reserved value that distinguishes INFO message 500 from other message types. For the described embodiment, the reserved value is one. The master node 102a id 504 included in INFO message 500 contains a unique value that identifies the node 102 on which INFO message 500 originated. Pad 506 contains no data but ensures that absolute time field 510, relative time field 512 and bad crystal bitmasks 514 are each word aligned. Mark time field 508 allows master node 102a to schedule the time at which slave nodes 102b–d will perform time updates. When initialized, absolute time field 510 contains an absolute time value that master node 102a has specified for a slave node 102b–d. Similarly, when initialized, relative time field 512 contains a relative time value (i.e., an amount to change the current time) that master node 102a has specified for a slave node 102b–d. Bad crystal bit masks 514 are used to identify which nodes 102 have malfunctioning time clocks 212. In general, it should be appreciated that the bit sizes of each of the components included in INFO message 500 are all representative. Different implementations of the present invention may use different sizes for any, or all, of these components.

Figure 6:
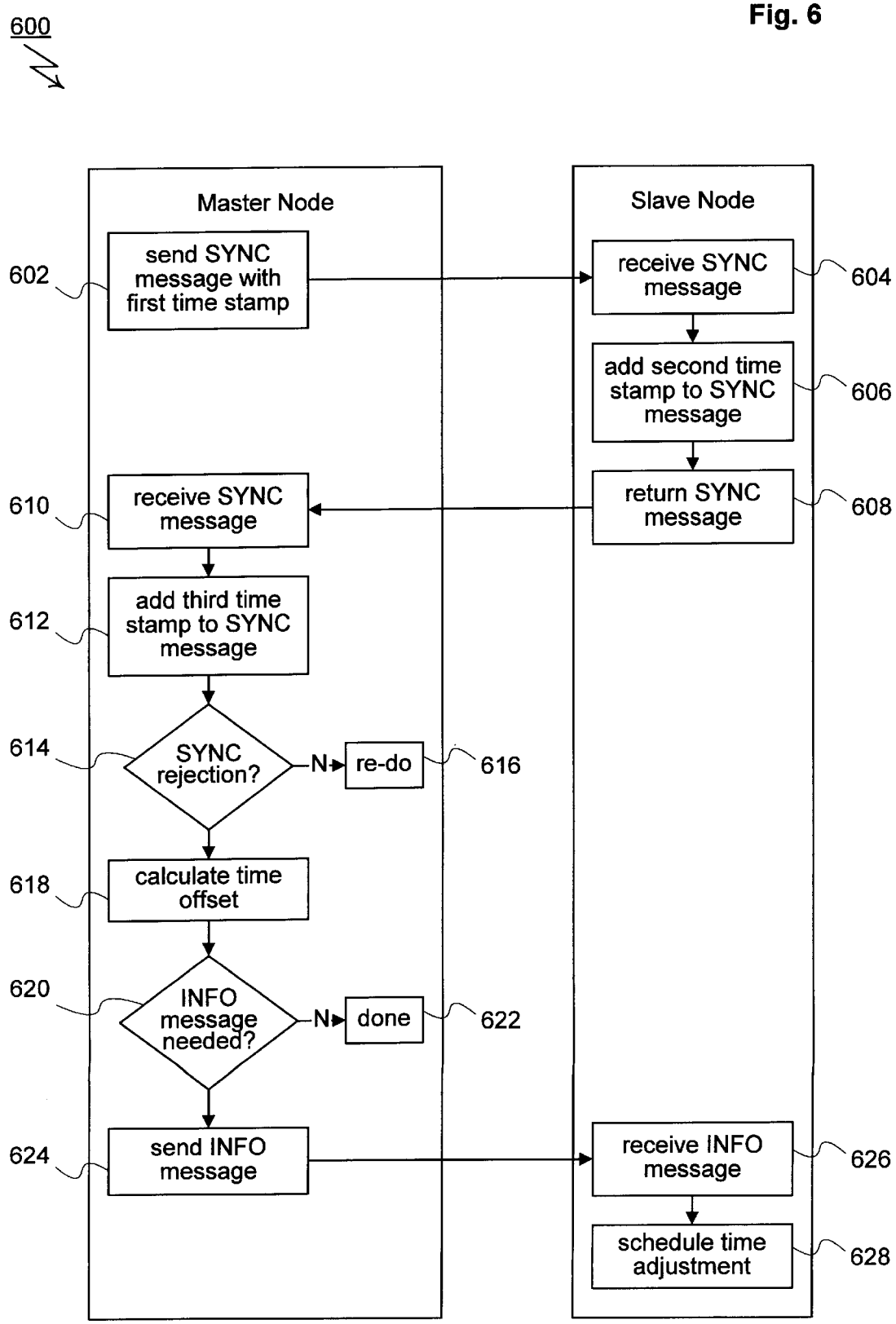
FIG. 6 is a flowchart showing the steps performed during synchronization of a slave node as used by an embodiment of the present invention.

In FIG. 6, an embodiment of a slave synchronization method used during calculation and scheduling period 302 is shown and generally designated 600. Method 600 is described in terms of a representative slave node 102 and time clock 212. It will be appreciated, however, that the same method is intended to be repeatable to synchronize all of the time clocks 212 and slave nodes 102 in SSI cluster 100. Master node 102a initiates method 600 by creating an instance of SYNC message 400 and sending the instance to the representative slave node 102 (see step 602). During creation of SYNC message 400, master node 102a initializes header 402 to the reserved value of zero. Master node 102a also initializes master node 102a id 404 to the numeric identifier of master node 102a. First time stamp 408 is initialized to be the current value of time clock 212a (i.e., the time clock 212a within master node 102a).

Slave node 102 receives the SYNC message 400 sent by master node 102a (see step 604). Upon receipt, slave node 102 initializes second time stamp 410 within SYNC message 400 to be the current value of time clock 212 (i.e., the time clock 212 within slave node 102) (see step 606). Slave node 102 then returns SYNC message 400 to master node 102a (see step 608).

Master node 102a receives the SYNC message 400 returned by slave node 102 (see step 610). Upon receipt, master node 102a initializes third time stamp 412 within SYNC message 400 to be the current value of time clock 212a (i.e., the time clock 212a within master node 102a) (see step 612). After initializing third time stamp 412, master node 102a determines if SYNC message 400 should be rejected (see step 614). SYNC message 400 is preferably rejected when master node 102a determines the round trip time between master node 102a and slave node 102 has exceeded a predefined threshold. In step 614, master node 102a makes this determination by subtracting first time stamp 408 from third time stamp 412. If the difference between third time stamp 412 and first time stamp 408 exceeds a predefined value, Method 600 terminates (see step 616).

Figure 7:
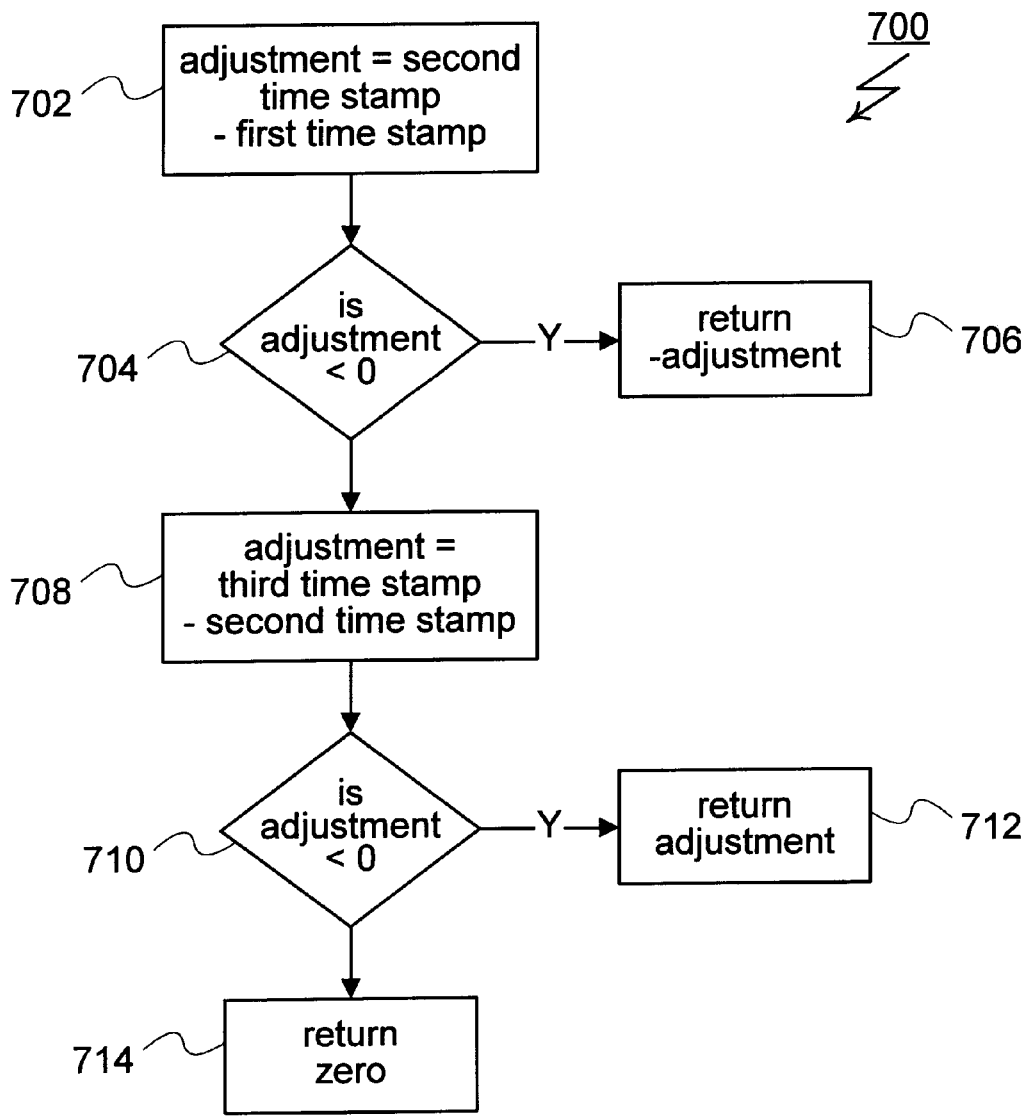
FIG. 7 is a flowchart showing the steps performed during calculation of a time adjustment used by an embodiment of the present invention.

If SYNC message 400 is not rejected in step 614, master node 102a continues method 600 by calculating a time offset (see step 618). The time offset calculated in step 618 is intended to represent the difference between time clock 212a included in master node 102a and time clock 212 included in slave node 102. A method for performing this calculation is shown in FIG. 7 and generally designated 700. Master node 102a initiates Method 700 by calculating an adjustment equal to first time stamp 408 subtracted from second time stamp 410 (see step 702). Master node 102a then compares the calculated adjustment to determine if it is less than zero (see step 704). If the calculated adjustment is less than zero, time clock 212 within slave node 102 lags behind time clock 212a within master node 102a. In this case, master node 102a completes method 700 by returning the absolute value of the calculated adjustment (see step 706).

In the alternative (i.e., where the calculated adjustment is greater than zero) master node 102a continues method 700 by recalculating the adjustment to be equal to second time stamp 410 subtracted from third time stamp 412 (see step 708). Master node 102a then compares the recalculated adjustment to determine if it is less than zero (see step 710). If the recalculated adjustment is less than zero, time clock 212 within slave node 102 leads time clock 212a within master node 102a. In this case, master node 102a completes method 700 by returning the recalculated adjustment (see step 712). In all other cases, master node 102a completes method 700 by returning zero (see step 714). In this way, the present invention provides a method for determining the calculated adjustment that is not dependent on the assumption that transmission delay to a node 102 is the same as transmission delay from the node 102.

Master node 102a continues method 600 by determining if an INFO message 500 should be sent to slave node 102 (see step 620). Sending an INFO message is required if any of the following conditions are true: 1) a time change has been requested for SSI cluster 100, 2) a time adjustment has been requested for SSI cluster 100, or 3) the time offset calculated in 618 is non-zero. Master node 102a determines if a time change or time adjustment has been requested by checking the state of respective global variables. If the global variable associated with time changes is non-zero, it contains an absolute time that has been specified for the time clocks 212 within SSI cluster 100. If the global variable associated with time adjustments is non-zero, it contains an adjustment that has been specified for the time clocks 212 within SSI cluster 100. If none of the three conditions is true (i.e., there is no time offset and there is no requested time change or adjustment), master node 102a completes method 600 (see step 622). In the alternative (i.e., where the calculated time offset is non-zero or there is a requested time change or adjustment), master node 102a continues method 600 by creating and sending an INFO message 500 (see step 624).

During creation of INFO message 500, master node 102a sets header 502 to the reserved value of one. Master node 102a also sets master node 102a id 504 to the numeric identifier of master node 102a. Master node 102a sets mark time field 508 to correspond to the beginning of the next time adjustment period 304 (i.e., the value calculated in task 306 of FIG. 3). This tells slave node 102 when to implement time changes and adjustments that are included in INFO message 500.

Absolute time field 510 is initialized by master node 102a to the value stored in the global variable associated with time changes (see description of step 620). Master node 102a preferably adjusts this value to reflect any time that elapses after a time change is requested and the before it is implemented by slave node 102. Master node 102a makes this adjustment by calculating the amount of time that falls between the time at which a time change is requested and the beginning of the next time adjustment period 304. Master node 102a then adds this amount to absolute time field 510. Master node 102a also initializes relative time field 512 during step 624. During this initialization, relative time field 512 is set to the sum of the time offset calculated by master node 102a in step 618 and the global variable associated with time adjustments (see description of step 620).

After completing the steps of method 600, master node 102a schedules the next invocation of method 600. If method 600 completed successfully (i.e., at steps 622 or 628), the next scheduled invocation will be performed for a new slave node 102b–d. In the alternative (i.e., where method 600 completes unsuccessfully at step 616) the next scheduled invocation will be performed for the same slave node 102.

Slave node 102 receives INFO message 500 sent by master node 102a (see step 626). Upon receipt, slave node 102 uses mark time field 508 to schedule the time at which time clock 212 will be updated. Slave node 102 then stores absolute time field 510 and relative time field 512 so that these values will be available when slave node 102 performs the scheduled update. When the scheduled time is reached, slave node 102 implements time changes by setting its time clock 212. In UNIX and UNIX-like environments, this is typically performed using the "stime" system call. Slave node 102 implements time adjustments by gradually advancing or retarding its time clock 212. In UNIX and UNIX-like environments, this is typically performed using the "adjtime" system call.

CALCULATION OF UPDATE CYCLE DURATION

The update cycle 300 shown in FIG. 3 has an overall duration of four seconds. This duration, and the duration of the components included within update cycle 300 are preferably chosen to optimize the effectiveness and reliability of time synchronization within SSI cluster 100. To select an optimal duration for update cycle 300 (and its components) each of the following characteristics must be defined:

1) maximum drift rate,
2) maximum round-trip time,
3) maximum time difference, and
4) number of retries.

The maximum drift rate reflects the greatest rate that any two normally functioning time clocks 212 within SSI cluster 100 will diverge. Maximum drift rates vary depending on the particular type of time clocks 212 used within SSI cluster 100. For the purposes of description, it may be assumed that any normally functioning time clock 212 will be accurate to within one-hundred parts per-million(100 PPM). Any two time clocks 212 will, as a result, have a maximum divergence of two-hundred parts per-million (200 PPM). The following description assumes that the maximum drift rate for SSI cluster 100 is two-hundred parts per-million (200 PPM).

The maximum round-trip time reflects the maximum amount of time that is allowed to elapsed before a SYNC message 400 is rejected (see step 614 of Method 600). The maximum round-trip time functions as an upper limit on the accuracy with which synchronization may be performed within SSI cluster 100. Therefore, it is desirable to define maximum round-trip time to be as small as possible. At the same time, a value of maximum round-trip time that is too small will cause excessive rejection of SYNC messages 400. As a result, maximum round-trip time must be balanced against the physical characteristics of SSI cluster 100 and network 104. The following description assumes that maximum round-trip time is one microsecond (1 ms).

The maximum time difference reflects the degree to which time clocks 212 are to be synchronized. Most UNIX and UNIX-like environments use a quanta known as a tick to define clock resolution. Ticks are typically defined as ten microseconds (10 ms). As a result, the smallest time difference that is detectable by processes is ten microseconds or one tick. For these environments, perfect synchronization between time clocks 212 is not required. Instead, it is generally adequate to ensure that time clocks 212 differ by less than five microseconds (5 ms). This gives time clocks 212 the appearance of being synchronized at the tick level.

The following description assumes that maximum time difference is five microseconds (5 ms).

To increase fault tolerance, it is generally useful to allow each SYNC message 400 to be retried one or more times within an update cycle 300. The number of retries reflects the minimum number of chances that master node 102a will have to send SYNC messages 400 to a given slave node 102 during a single update cycle 300. In general, the number of retries may be tailored to reflect the underlying reliability of network 104 and the overall need for fault tolerance. The following description assumes that the number of retries is four.

Based on the characteristics described above, the maximum duration of update cycle 300 is calculated using the following formula:

$$\text{maximum duration} = \frac{\text{maximum time difference} - \text{maximum round trip time}}{\text{maximum drift rate}}$$

This formula yields a result of twenty seconds for the values assumed in the preceding description (i.e., maximum time difference of 5 ms, maximum round-trip of 1 ms, maximum drift rate of 100 PPM). Thus, for the particular set of characteristics described, update cycle 300 must repeat at least every twenty seconds to maintain synchronization of time clocks 212. To provide a degree of fault-tolerance, it is assumed that update cycle will have to be retried as many as four times to properly synchronize all nodes 102 within SSI cluster 100. For this reason, the twenty second maximum duration is divided by five to achieve a four second fault-tolerant duration for update cycle 300.

Within update cycle 300, some portion of time must be devoted to calculation and scheduling period 302 and some period of time must be devoted to time adjustment period 304. The amount of time required for calculation and scheduling period 302 depends, to a large degree, on the number of nodes 102 that must be synchronized. In FIG. 3, two and one-half seconds of update cycle 300 are reserved for calculation and scheduling period 302. This allows master node 102a to synchronize more than two-hundred nodes 102 at a rate of one node 102 per tick (10 ms). In cases where SSI cluster 100 will never include two-hundred nodes 102, it is possible to decrease the duration of calculation and scheduling period 302. Alternately, it is possible to maintain the duration of calculation and scheduling period 302 but synchronize nodes 102 at a slower rate. This spreads network traffic associated with time synchronization.

In FIG. 3, one second of update cycle 300 is reserved for time adjustment period 304. This leaves a gap of one-half second between calculation and scheduling period 302 and time adjustment period 304. Use of a gap ensures that all operations begun in calculation and scheduling period 302 have completed prior to the beginning of time adjustment period 304. The duration of time adjustment period 304 controls the degree to which time clocks 212 may be adjusted during this period. For example, in a representative implementation of SSI cluster 100 time adjustment will cause time clocks 212 to speed or slow time clocks by approximately eight per-cent. As a result, time clocks 212 may be adjusted by a total of eight microseconds (8 ms) during the one second duration of time adjustment period 304. In some cases, it may be desirable to increase the duration of time adjustment period 304 (by decreasing the duration of calculation and scheduling period 302). This allows larger time adjustments to be made during time adjustment period 304.

DYNAMIC ADJUSTMENT TO UPDATE CYCLE DURATION

As shown in FIG. 3, update cycle 300 has a fixed duration of four seconds. In some cases, it may be desirable to dynamically adjust the duration of update cycle 300. This provides increased efficiency over a wider range of operational characteristics and conditions.

Figure 8:
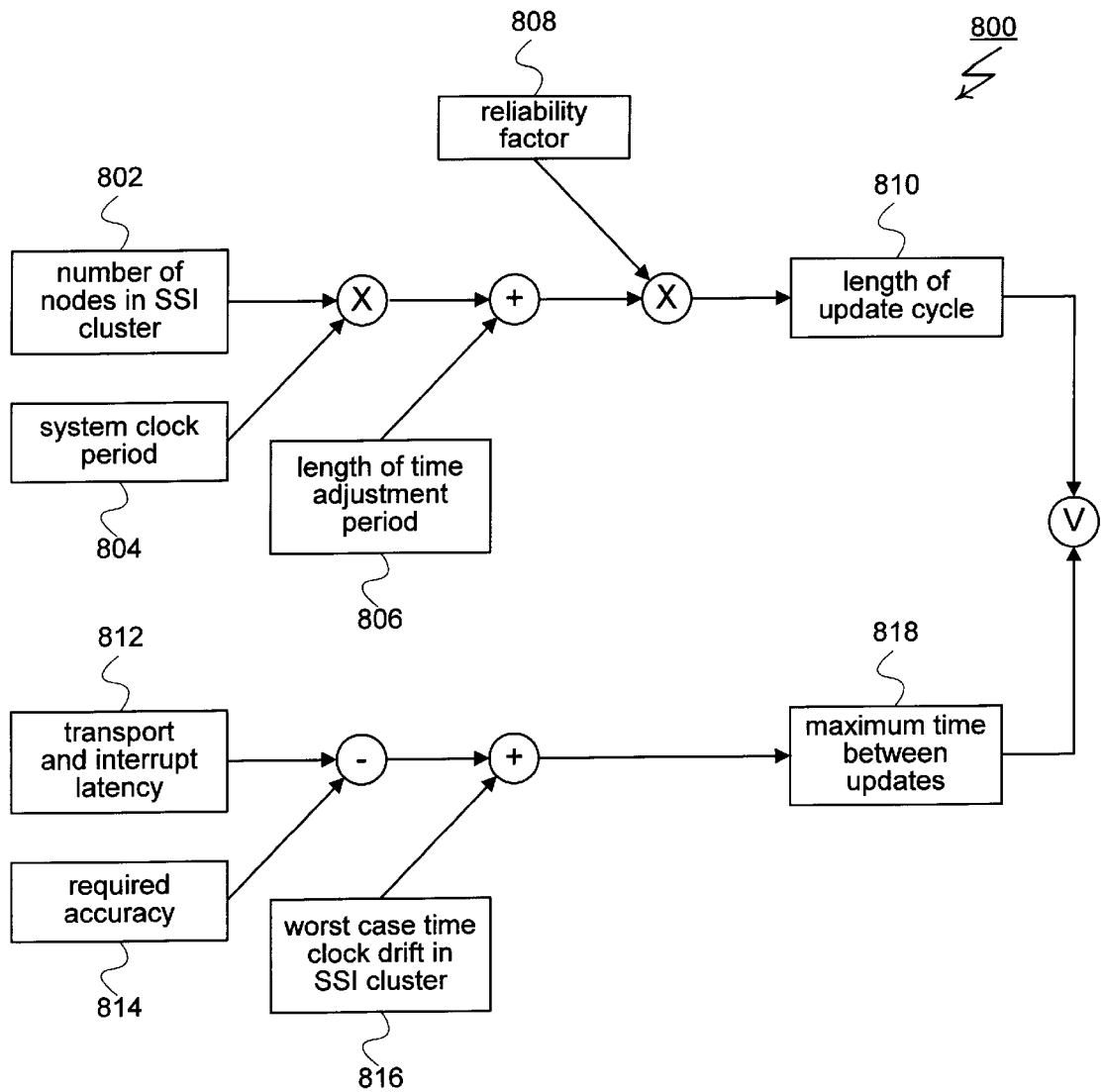
FIG. 8 is a data flow showing a process for dynamically determining update cycle duration and frequency as used by an embodiment of the present invention.

In FIG. 8, a data flow diagram for dynamically adjusting the duration of update cycle 300 is shown and generally designated 800. Data flow diagram 800 is intended to show the inputs and the processing steps that master node 102a would use to dynamically adjust the duration and frequency of update cycle 300. Data flow diagram 800 includes seven inputs:

1) number of nodes 102 in the SSI cluster 100 (box 802). The number of nodes 102 may be a dynamically adjusted number (i.e., the number of currently active nodes 102) or may be a statically calculated number. For the purposes of this description, it will be assumed that master node 102a defines the number of nodes 102 in box 802 using a combination of static and dynamic methods (i.e., calculated as the number of currently active nodes plus some number reserved for immediate future growth).

2) The system clock period (box 804). Master node 102a preferably defines the system clock period used in box 804 as the period of the time clocks 212 included in SSI cluster 100.

3) Length of time adjustment period 304 (box 806). Master node 102a preferably reserves a predefined amount of time for time adjustment period 304. Greater amounts of time increase the amount that time clocks 212 may be adjusted during an update cycle 300. Smaller amounts of time decrease the length of update cycle 300 or increase the number of nodes 102 that may be synchronized.

4) Reliability factor (box 808). This defines the minimum number of update cycles 300 that can pass before accuracy of time synchronization within SSI cluster 100 may be impaired. Master node 102a preferably uses a predefined constant for this value.

5) Transport and interrupt latency (box 812). This is an average value for round-trip messages in SSI cluster. Master node 102a is preferably configured to dynamically calculate this value.

6) Required accuracy (box 814). This is the maximum time difference that is allowed between any two time clocks 212 in SSI cluster 100. Master node 102a preferably uses a predefined constant, such as one millisecond (1 ms), for this value.

7) Worst case time drift in SSI cluster 100 (box 816). This is the worst detected drift of any time clock 212 from the time clock 212 in master node 102a. Master node 102a is preferably configured to dynamically calculate this value.

Master node 102a combines the first four of these inputs (boxes 802 through 808) using a series of arithmetical or quasi-arithmetical operators. The result computed by master node 102a is the maximum length of update cycle 300 (box 810). Master node 102a combines the remaining inputs (boxes 812 through 816) using a series of arithmetical or quasi-arithmetical operators. The result computed by master node 102a is the maximum time between of update cycles 300 (box 818). The two computed values function as upper and lower bounds. Master node 102a is free to choose any duration of update cycle 300 and time between update cycle 300 that satisfied both of these constraints.

UPDATE CYCLE SKIPPING

Figures 9, 10:
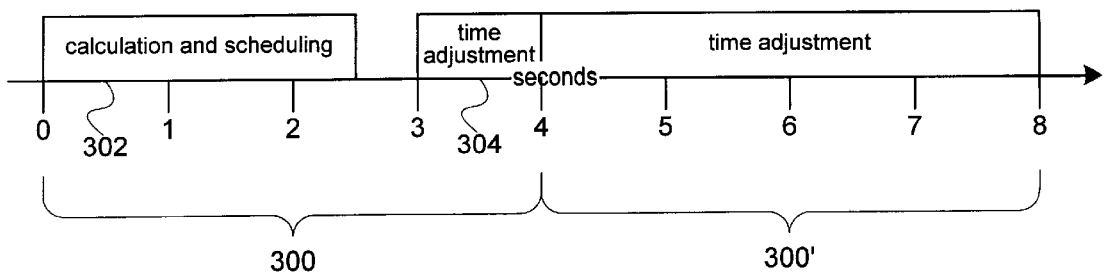
FIG. 9 is a time line showing update cycle skipping as performed by an embodiment of the present invention.
FIG. 10 is a block diagram showing an entry data structure as used within a per-node data repository of an embodiment of the present invention.

As described, time adjustments made during time adjustment period 304 are limited by the duration of time adjustment period 304. For the example described above, the result is that a single time adjustment can add or subtract no more than 8 ms to time clocks 212. To accomplish larger time adjustments, master node 102a has the option of skipping one or more update cycles 300 following time adjustment period 304. Skipping of update cycles is understood more clearly by reference to FIG. 9. In FIG. 9, an update cycle 300 is shown followed by a skipped update cycle 300'. Unlike update cycle 300, skipped update cycle 300' does not include calculation and scheduling period 302 or time adjustment period 304. As a result, any time adjustment initiated by master node 102a in update cycle 300 will continue into skipped update cycle 300'. The result is that time adjustments have a longer period in which to complete. Specifically, in the case of FIG. 9, it may be seen that by skipping a single update cycle 300, a time adjustment is given a total of five seconds. The result is that a single time adjustment can add or subtract up to forty microseconds (40 ms) to time clocks 212.

The use of skipped update cycle 300 may be extended so that update cycle 300 is followed by a series of skipped update cycles 300'. It should be appreciated, however, that each skipped update cycle 300' decreases the fault-tolerant qualities of time synchronization (since the skipped update cycle 300' is not available for retries). Furthermore, even in cases where fault-tolerance may safely be ignored, update cycle 300 must still repeat often enough to ensure synchronization of time clocks 212. For the described example, this means that (assuming no fault-tolerance) update cycle 300 must repeat at least once every twenty seconds. As a result, for this particular embodiment, each update cycle 300 may be followed by no more than four skipped update cycles 300'.

PER-NODE DATA REPOSITORY

To increase fault-tolerance, each node 102 in SSI cluster 100 maintains a data repository. Each data repository contains a series of entries of the type shown in FIG. 10 and generally designated 1000. Each entry 1000 corresponds to a particular node 102 within SSI cluster 100. Preferably, each repository includes one entry 1000 for each node 102.

As shown in FIG. 10, entry 1000 comprises a series of variable 1002 through 1022. Node_number 1002 is an integer variable. The value in node_number 1002 identifies the particular node 102 that is associated with entry 1000. Node_is_up 1004, bad_crystal 1006 and is_master 1008 are boolean variables. The value in node_is_up 1004 indicates whether the node 102 associated with entry 1000 is operational. The value in bad_crystal 1006 indicates whether the node 102 associated with entry 1000 includes a malfunctioning time clock 212. The value in is_master 1008 indicates whether the node 102 associated with entry 1000 is the master node 102a. Last_correction_time 1010 is a sixty-four bit data structure that contains separate thirty-two bit variables for seconds and microseconds. The value in last_correction_time 1010 is the time at which an INFO message 500 was last sent to the node 102 associated with entry 1000. Est_drift_rate 1012 is a long integer variable. The value in est_drift_rate 1012 is an estimate of the rate at which the time clock 212 included in the node 102 associated with entry 1000 diverges from the time clock 212 included in master node 102a. Last_contact 1014 is a sixty-four bit data structure that contains separate thirty-two bit variables for seconds and microseconds. The value in last_contact 1014 is the time at which master node 102a last successfully contacted the node 102 associated with entry 1000. Max_delay 1016, min_delay 1018, avg_delay 1020, and avg_count 1022 are integer variables. The values in max_delay 1016, min_delay 1018 and avg_delay 1020 are the maximum, minimum and average round-trip times from master node 102a to the node 102 associated with entry 1000, respectively. Avg_count 1022 is a counter used to calculate avg_delay 1020.

Nodes 102 create and update entries 1000 to reflect changing conditions within SSI cluster 100. Upon notification that a node 102 has joined SSI cluster 100, each existing node 102 creates and initializes a new entry 1000 to correspond to the added node 102. The node_number 1002 of the created entries 1000 correspond to the node 102 that has joined SSI cluster 100. The node_is_up 1004, bad_crystal 1006 and is_master 1008 variables of the created entries 1000 are initialized to true, false, and false values, respectively.

Upon notification that a node 102 has left SSI cluster 100, each remaining node 102 retrieves its entry 1000 that matches the departed node 102. Each node 102 then sets the node_is_up 1004 variable within its retrieved entry 1000 to false.

Master node 102a detects bad time clocks 212 located within slave nodes 102a–d and within master node 102a. As discussed, INFO message 500 includes eight thirty-two bit bad crystal bitmasks 514. Master node 102a uses bad crystal bitmasks 514 to propagate the identity of nodes 102 having defective time clocks 212 throughout SSI cluster 100. Master node 102a propagates this information by associating individual bits within bad crystal bitmasks 514 to individual nodes 102 within SSI cluster 100. As an example, master node 102a may associate the node 102 having the lowest identification number with the first bit in bad crystal bitmasks 514. The node 102 having the next lowest identification number would then be associated with the second bit in bad crystal bitmasks 514, and so on. Before sending an INFO message 500, master node 102a sets each bit in bad crystal bitmasks 514 that is associated with a node 102 known to include a bad time clock 212. The slave node 102 that receives an INFO message 500 uses the set bits in bad crystal bitmasks 514 to update entries 1000 that correspond to nodes 102 known to include bad time clocks 212. Each entry 1000 of this type is updated to include a true bad_crystal 1006 variable.

Receipt of an INFO message 400 or a SYNC message 500 causes the receiving node 102 to retrieve the entry 1000 associated with the node 102 identified as the message source (i.e., the node 102 identified in the master node 102a 404 or master node 102a 504 fields). The receiving node 102 sets the is_master 1008 variable within the retrieved entry 1000 to a true value. The receiving node 102 ensures that no other entries 1000 have true is_master 1008 variables.

The remaining variables in each entry 1000 (i.e., last_correction_time 1010, est_drift_rate 1012, last_contact 1014, max_delay 1016, min_delay 1018, avg_delay 1020, avg_count 1022) are updated exclusively by master node 102a. Master node 102a updates two of these variables, last_correction_time 1010 and est_drift_rate 1012, each time master node 102a sends an INFO message 500 to correct a drifting time clock 212 (i.e., whenever master node 102a sends an INFO message 500 that includes a time adjustment to correct a drifting time clock 212). Master node 102a performs these updates by retrieving the entry 1000 associated with the node 102 that includes the drifting time clock 212. Master node 102a then updates the last_correction_time 1010 variable in the retrieved entry 1000 to reflect the current time. The prior value of last_correction time 1010 is saved for use during calculation of est_drift_rate 1012. The saved value of last_correction_time 1010 is used by master node 102a to solve the following equation:

$$\text{est\_drift\_rate} = \frac{\text{amount\_of\_correction}}{\text{current time} - \text{last\_correction\_time}}$$

Master node 102a uses the results of this computation to update the est_drift_rate 1012 variable in the retrieved entry 1000.

Master node 102a updates the remaining variables (last_contact 1014, max_delay 1016, min_delay 1018, avg_delay 1020 and avg_count 1022) each time master node 102a receives a SYNC message 400 from a slave node 102. Master node 102a performs these updates by retrieving the entry 1000 associated with the node 102 from which the SYNC message 400 was received. Master node 102a then updates the last_contact 1014 variable in the retrieved entry 1000 to reflect the current time.

Master node 102a subtracts the first time stamp 408 from the third stamp 412 of the received SYNC message 500 to compute a round trip delay. Master node 102a updates the max_delay 1016 variable included in the retrieved entry 1000 to be the greater of the current value of max_delay 1016 and the computed round trip delay. Similarly, master node 102a then updates the min_delay 1018 variable included in the retrieved entry 1000 to be the lesser of the current value of min_delay 1018 and the computed round trip delay.

Master node 102a preferably uses the following formula to compute and update avg_delay 1020:

$$\text{avg\_delay}_{new} = \text{avg\_delay}_{old} - \left(\frac{\text{avg\_delay}_{old}}{\text{fraction}}\right) + \left(\frac{\text{round\_trip\_delay}}{\text{fraction}}\right)$$

where fraction is:

$$\text{fraction} = \left(\frac{1}{\text{avg\_count}+1}\right)$$

The first time that master node 102a computers avg_delay 1020, avg_count 1022 is zero and avg_delay 1020 in entry 1000 is replaced with the computed round trip delay. During each subsequent computation of avg_delay 1020, avg_count 1022 is incremented and fraction becomes smaller. As a result, the computed round trip delay has a diminishing effect of avg_delay 1020. To prevent the computed round trip delay from becoming completely ineffective, master node 102a is preferably configured to cease incrementing avg_count 1020 when a predetermined limit is reached.

For one implementation, the computation of avg_delay 1020 is performed using integer values. The integers are defined as fixed-point values using twelve bits for the fractional part and 20 bits for the integer part. For this particular implementation, avg_count 1022 is limited to one-hundred and twenty-seven.

DETECTION OF DEFECTIVE TIME CLOCKS

Master node 102a is preferably configured to detect malfunctioning time clocks 212 within slave nodes 102b–d. To determine if a given slave node 102 includes a malfunctioning time clock 212, master node 102a retrieves the entry 1000 associated with the slave node 102. If the est_drift_rate 1012 variable included in the retrieved entry 1000 falls outside of predetermined range, master node 102a marks the entry 1000 for the node 102 to indicate that it has a defective time clock 212. For some embodiments, this strategy may be extended to require that the est_drift_rate 1012 variable fall outside of predetermined range for a predetermined number of update cycles 300. In either case, the steps required to perform detection of malfunctioning time clocks 212 within slave nodes 102 are preferably included as an extension of slave synchronization method 600 of FIG. 6.

Master node 102a is also preferably configured to detect malfunctioning time clocks 212 within master node 102a. To determine if the time clock 212 included in master node 102a is malfunctioning, master node 102a traverses the entries 1000 associated with slave nodes 102b–d. If more than half of these entries 1000 include est_drift_rate 1012 variables that fall above a predetermined range, master node 102a marks its own entry 1000 to indicate that master node 102a has a defective time clock 212. Similarly, if a majority of the est_drift_rate 1012 variables fall below the predetermined range, master node 102a marks its own entry 1000 to indicate that master node 102a has a defective time clock 212. In cases where master node 102a discovers that its own time clock 212 is defective, master node 102a clears the bad_crystal 1006 variable in each entry 1000 for each slave node 102. Master node 102a then sends each slave node 102b–d an INFO message 500. The INFO message does not include time adjustments or time changes, but does include bad crystal bit masks 514. The bad crystal bit masks 514 inform slave nodes 102b–d that master node 102a has a defective time clock 212.

REPLACEMENT OF MASTER NODE

Figure 11:
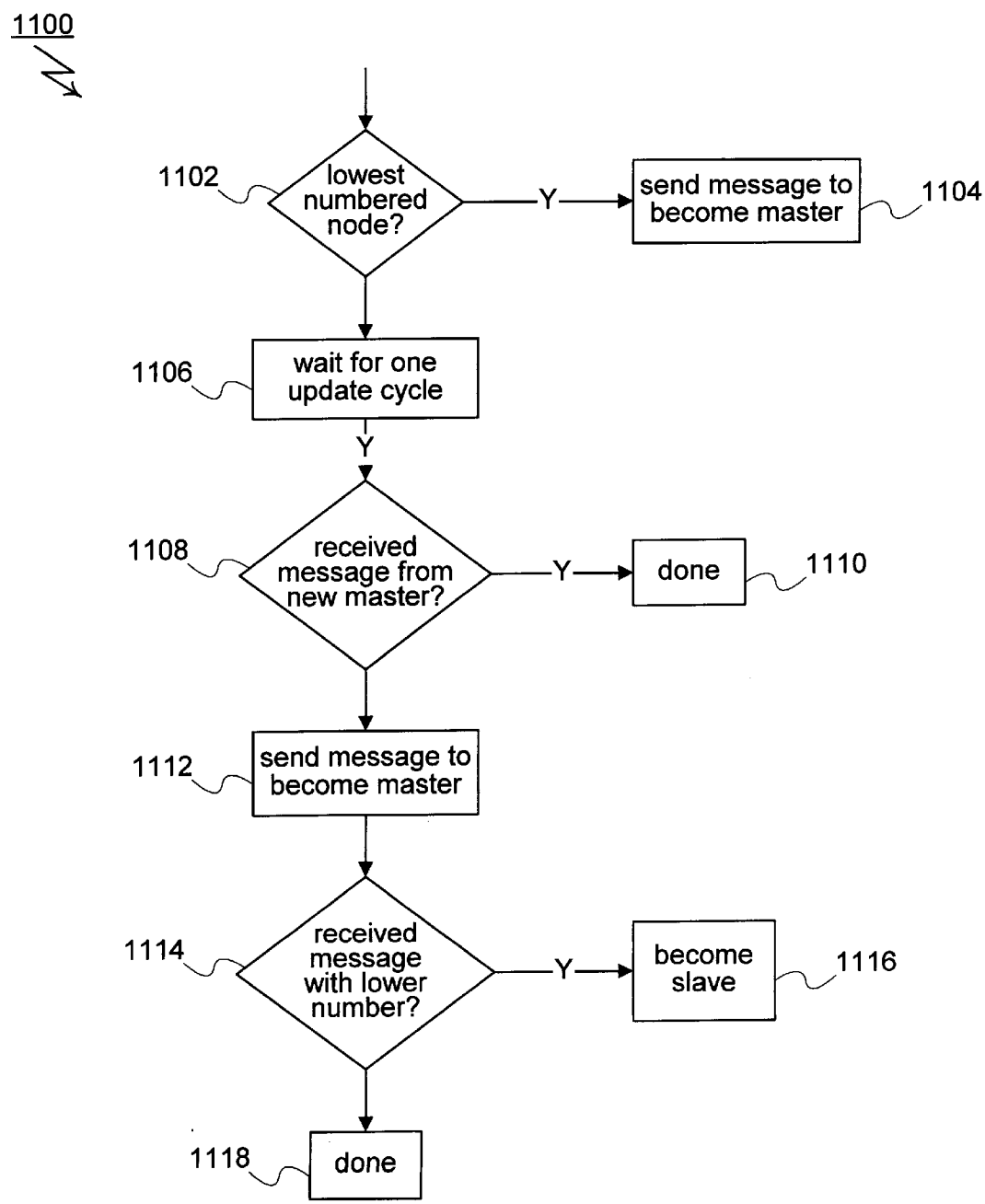
FIG. 11 is a flowchart showing a method for selection of a replacement master node as used by an embodiment of the present invention.

In FIG. 11, a method for selecting a new master node 102a is shown and generally designated 1100. Method 1100 is intended to illustrate the steps performed by a representative slave node 102. It will be appreciated, however, that the same method is intended to be performed by each slave node 102b–d each time election of a new master node 102a is required.

Slave node 102 invokes method 1100 to respond to a range of different events. These events include: 1) notification that master node 102a has left SSI cluster 100, 2) absence of SYNC messages 400 from the master node 102a for a predetermined number of update cycles 300, and 3) receipt of an INFO message 500 indicating that the master node 102a has determined that its own time clock 212 is defective.

Slave node 102 initiates method 1100 by determining if is the lowest numbered node 102 that is currently active in SSI cluster 100 (see step 1102). Slave node 102 makes this determination by traversing the entries 1000 included in its per-node data repository. During this traversal, slave node 102 looks for entries 1000 having node_numbers 1002 that are lower than the slave node 102. If no entry 1000 of this type exists, slave node 102 sends a message to each node 102 in SSI cluster 100 (see step 1104). The message sent in step 1104 informs each node that slave node 102 has declared itself to be the master node 102a for SSI cluster 100.

In the alternative (i.e., where slave node does not conclude that it is the lowest numbered node 102 included in SSI cluster 100) slave node 102 waits for one update cycle 300 to complete (see step 1106). Waiting for a single update cycle 300 allows another slave node 102 to determine that it is the lowest numbered remaining node 102 and to send a message declaring that it is the master node 102a.

At the conclusion of the waiting process, slave node 102 determines if it has received a message from another node 102 declaring that node to be the master node 102a (see step 1108). If a message of this type is received, slave node 102 continues to operate as a slave and ends method 1100 (see step 1110). In the alternative, slave node 102 sends a message to all other slave nodes 102 declaring that it is the master node 102a (see step 1112).

In the event that slave node 102 sends a message of this type, it will generally be the case that other slave nodes 102 will be sending similar messages. Slave node 102 checks each of these messages to determine if a lower numbered slave node 102 has declared itself to be the master node 102a (see step 1114).

In the positive case (i.e., where slave node 102 receives a message from a lower numbered slave node 102), slave node 102 resumes its role as a slave and ends method 1000 (see step 1116). If no message of this type is received, slave node 102 starts operation as master node 102a (see step 1118).

UNIX IMPLEMENTATION SPECIFICS

As described with regard to FIG. 6, slave nodes 102 use "stime" and "adjtime" system calls to change and adjust their time clocks 212. In many UNIX and UNIX-like environments, these system calls are configured to alter time clocks 212 by whole tick values. As a result, a call to "adjtime" that specifies that a time clock 212 be adjusted by one and one-half ticks has the same effect as a call that specifies a one tick adjustment. To align time clocks 212 at the tick level, it is, however, generally necessary to specify time changes and adjustments at the sub-tick level. Thus, for the purposes of the present invention, it is preferable that "stime" and "adjtime" be implemented in a way that does not ignore partial tick values. For most UNIX and UNIX-like environments, this is accomplished through modifications to the existing "stime" and "adjtime" implementations. The modifications disable or remove code that masks or otherwise ignores sub-tick values.

Sub-tick synchronization also generally requires the ability to access time clocks 212 with partial tick accuracy. This increases the accuracy of first time stamp 406, second time stamp 408, and third time stamp 410 when set by master node 102a and slave nodes 102. In many UNIX and UNIX-like environments, the required degree of accuracy is already provided by the microtime system call. In other cases, a system call having this type of accuracy may be specially implemented.

FUNCTION SHIPPING

In typical UNIX and UNIX-like environments, time changes and adjustments made on a slave node 102 are applied to the time clock 212 within the master node 102a. In the case of SSI cluster 100, however, it may be appreciated that the effect of a change or adjustment of this type would be rapidly erased by time synchronization. As a result, for the purposes of the present invention, it is preferable to modify both adjtime and stime system calls to work in a function-ship mode. In this mode, time changes and adjustments that are not performed as part of time synchronization are sent to master node 102a. Master node 102a applies the time changes and adjustments to its own time clock 212. The changes are adjustments are then applied across the SSI cluster during time synchronization.

CONCLUSION

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for time synchronization in a computer cluster, the method comprising the steps of:

a) generating, by a master node, a first time stamp;

b) sending, by the master node, a SYNC message;

c) receiving, by a slave node, the SYNC message;

d) generating, by the slave node, a second time stamp;

e) sending, by the slave node, the second time stamp;

f) receiving, by the master node, the second time stamp;

g) generating, by the master node, a third time stamp;

h) sending, by the slave node, the SYNC message;

i) calculating, by the master node, a time adjustment value based on the first time stamp and second time stamp, or the second time stamp and third time stamp; and j) sending an INFO message including the time adjustment value from the master node to the slave node.

2. A method as recited in claim 1 further comprising the step, performed by the master node, of scheduling steps a) through j) to be repeated for a second slave node in the computer cluster.

3. A method as recited in claim 1 further comprising the step, performed by the slave node, of gradually adjusting a time clock within the slave node based on the time adjustment value included in the INFO message.

4. A method as recited in claim 3 further comprising the steps of:

calculating, by the master node, a beginning time value for a time adjustment period;

including, by the master node, the beginning time value in the INFO message; and scheduling, by the slave node, the gradually adjusting step to begin at the beginning time value.

5. A method as recited in claim 1 further comprising the steps of:

calculating, by the master node, a time change value, the time change value corresponding to a time change scheduled for the computer cluster;

including, by the master node, the time change value in the INFO message; and setting a time clock within the slave node based on the time change value included in the INFO message.

* * * * *